United States Patent [19]

Garavaglia et al.

[11] Patent Number: 4,659,287
[45] Date of Patent: Apr. 21, 1987

[54] HELICOPTER ENGINE-DRIVE ASSEMBLY

[75] Inventors: Attilio Garavaglia, Gallarate; Rinaldo Gonzato, Cassano Magnago, both of Italy

[73] Assignee: Costruzioni Aeronautiche Giovanni Agusta S.p.A., Italy

[21] Appl. No.: 733,488

[22] Filed: May 10, 1985

[30] Foreign Application Priority Data

May 29, 1984 [IT] Italy .............................. 67545 A/84

[51] Int. Cl.[4] ............................................. B64C 27/12
[52] U.S. Cl. .................................... 416/170 R; 403/23
[58] Field of Search .............. 416/244 R, 248, 170 R, 416/170 B; 464/170, 172, 177, 901; 285/31, 133 R, 138; 403/11, 23, 348, 337

[56] References Cited

U.S. PATENT DOCUMENTS

| 2,650,112 | 8/1953 | Kinkead | 285/133 R |
| 2,759,491 | 8/1956 | Everhart | 285/133 R |
| 2,788,680 | 4/1957 | Wachs | 416/170 B |
| 4,281,895 | 8/1981 | Mohr | 403/348 |
| 4,326,392 | 4/1982 | Geisthoff et al. | 403/23 |
| 4,501,572 | 2/1985 | Hook | 464/170 |

Primary Examiner—Everette A. Powell, Jr.
Attorney, Agent, or Firm—Kane, Dalsimer, Kane, Sullivan and Kurucz

[57] ABSTRACT

Helicopter engine-drive assembly on which the engine and drive unit are connected by a propeller shaft extending inside an articulated tubular member connected in removable manner, at one end, to the casing on the engine and, at the other end, to the casing on the drive unit and consisting of at least two segments at least one of which consists of two portions connected telescopically and secured in a given mutual position by releasable, removable fastening means.

3 Claims, 2 Drawing Figures

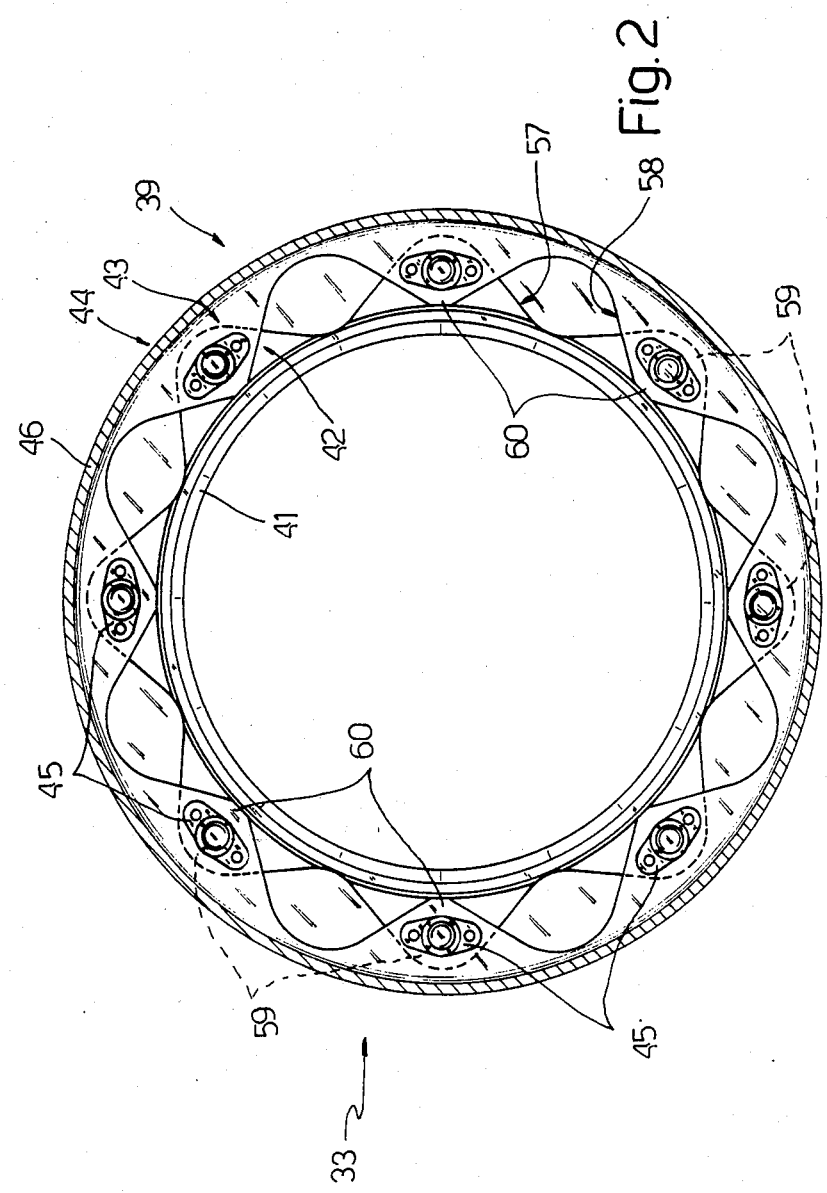

4,659,287

HELICOPTER ENGINE-DRIVE ASSEMBLY

BACKGROUND OF THE INVENTION

The present invention relates to a helicopter engine-drive assembly.

On helicopters, the engine and the unit driving the rotors and utilities are known to be connected by means of an articulated member located between the engine casing and the outer casing on the said drive unit.

The said articulated member usually comprises a tubular body consisting of two segments, one integral with a wall on the said drive casing and the other integral with the engine casing, the said two segments being connected by a universal joint and housing a propeller shaft connecting the output on the engine to the input on the said drive unit.

Employment of the said articulated member and universal joint may cause problems if the said universal joint, as is usually the case, consists of an elastomer joint. If such is the case, the propeller shaft and the said drive unit may only be removed by detaching the engine from the supports securing it to the helicopter structure and removing it from the structure itself.

SUMMARY OF THE INVENTION

The aim of the present invention is to overcome the aforementioned drawback by enabling the propeller shaft and/or drive unit to be removed without removing the engine.

With this aim in view, the present invention relates to a helicopter engine-drive assembly comprising an engine, a drive unit, a propeller shaft extending between the output on the said engine and the input on the said drive unit, and an articulated tubular member connected in removable manner, at one end, to the casing on the said engine and, at the other end, to the casing on the said drive unit, the said propeller shaft extending inside the said articulated tubular body, and the latter comprising at least two segments connected together by means of a ball joint, characterised by the fact that at least one of the said two segments comprises at least two coaxial portions connected together telescopically; removable fastening means being provided for locking the said two portions in a given mutual axial position.

BRIEF DESCRIPTION OF THE DRAWINGS

The present invention will now be described by way of a non-limiting example with reference to the attached drawings in which:

FIG. 2 shows a section along line II—II in FIG. 1.

DETAILED DESCRIPTION OF THE INVENTION

Figure 1:
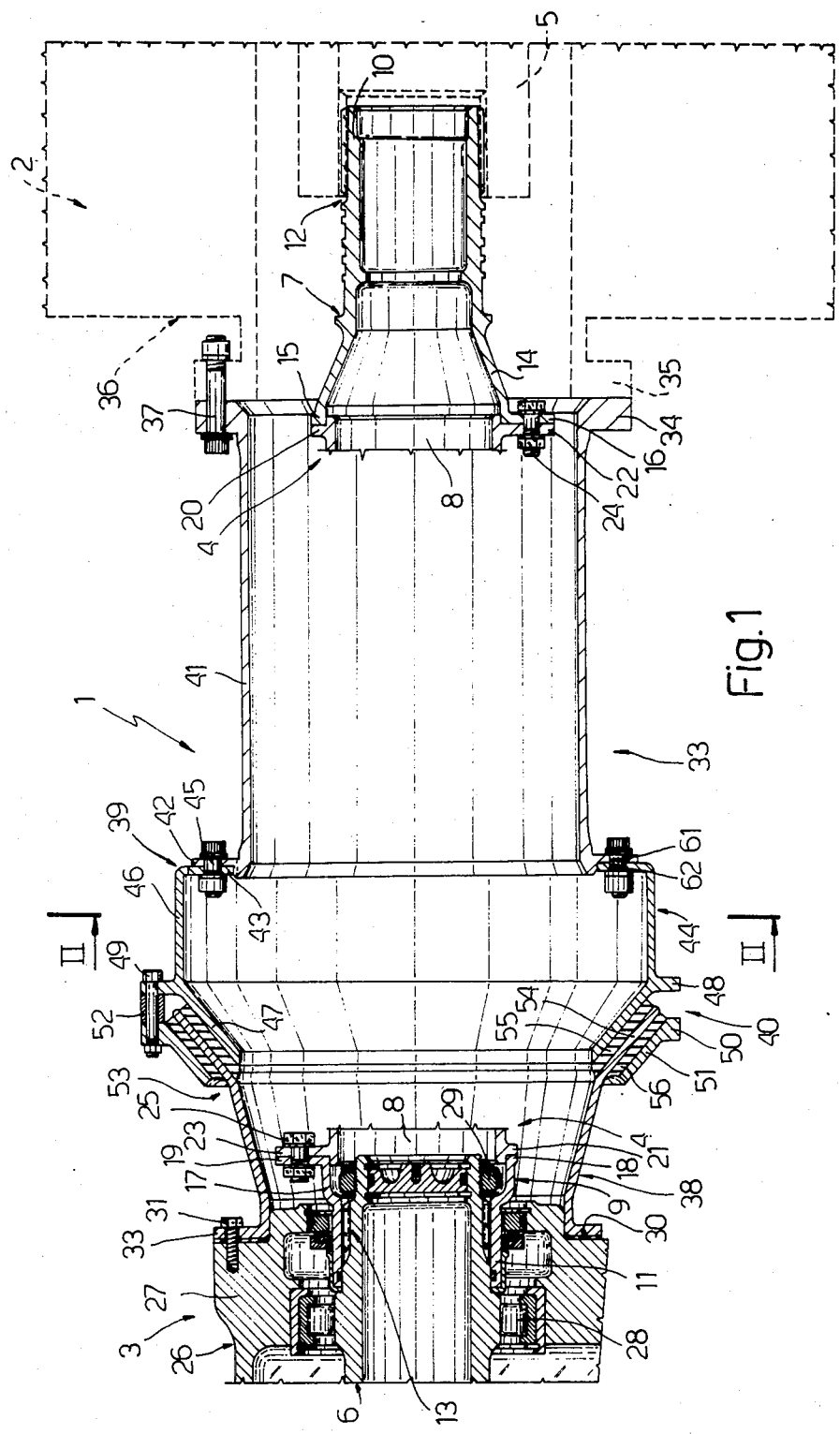
FIG. 1 shows an axial section, with parts removed for clarity, of a helicopter engine-drive assembly according to the present invention.

FIG. 1 shows a helicopter engine-drive assembly 1 comprising an engine 2, a drive unit 3 and a propeller shaft 4 connecting output shaft 5 on engine 2 to input shaft 6 on unit 3.

Propeller shaft 4 consists of three coaxial segments, 7, 8 and 9, of which segments 7 and 9, arranged at opposite ends of intermediate segment 8, present respective end sections 10 and 11 connected by respective splined couplings 12 and 13 to shafts 5 and 6 respectively.

In more detail, end section 10 presents a number of external splines connected to internal splines (not shown) on shaft 5, and extends from an integral casing 14 having an annular end flange 15 from which extend, radially outwardly, ears 16 evenly spaced around casing 14. End section 11 presents a number of internal splines connected to a number of external splines on shaft 6, and extends from a casing 17 integral with section 11 and having an annular end flange 18 from which extend, radially outwardly, ears 19 identical to ears 16 and, like the latter, evenly spaced around casing 17.

Segment 8 is essentially cylindrical and provided, at opposite ends, with two annular flanges, 20 and 21, the latter contacting respectively and having the same diameters as flanges 15 and 18 and from which extend, radially outwardly, respective ears 22 and 23 facing and contacting respective ears 16 and 19 on casings 14 and 17.

Segment 8 is made integral with segments 7 and 9 by means of a first number of bolts 24, fitted through coaxial through holes formed in a respective pair of ears 22 and 16, and by a second number of bolts 25 fitted through coaxial through holes formed in a respective pair of ears 23 and 19.

As shown in FIG. 1, drive unit 3 comprises a casing 26 having a tubular appendix 27 supporting internally, in rotary manner by means of bearings 28, shaft 6, the free end of which is locked axially inside casing 17 by means of ring nut 29.

The free end of appendix 27 presents an annular surface 30 coaxial with shaft 6 and connected, via a number of screws 31, to an end flange 32 on articulated tubular member 33. The other end of the latter presents a second flange 34 connected to a flange 35 on casing 36 of engine 2 by means of a number of bolts 37 evenly spaced on flanges 34 and 35 around propeller shaft 4 with which flanges 34 and 35 are essentially coaxial.

Member 33 consists of two tubular segments, 38 and 39, integral with flanges 32 and 34 respectively and connected together by means of an articulated elastomer ball joint 40.

Tubular segment 39 comprises a first cylindrical portion 41 integral with flange 34 and extending from the latter towards joint 40. On the end facing casing 26, portion 41 presents an external annular flange 42 connected to an internal annular flange 43 on a second portion 44 of segment 39 by means of a number of bolts 45. Portion 44 comprises a cylindrical body 46, extending from the outer edge of flange 43 towards casing 26, and a truncated-cone body 47 tapered towards casing 26 and extending from the end of cylindrical body 46 opposite to the one connected to flange 43. At the blend point between bodies 46 and 47, portion 44 presents an external annular flange 48 through which extend bolts 49. Each bolt 49 engages a respective hole in an external flange 50 on a truncated-cone ring 51 arranged on the outside of truncated-cone body 47 and kept at a given distance from it by tubular spacers 52 on bolts 49, so as to form, between body 47 and ring 51, an annular truncated-cone seat 53 open on the side facing casing 26.

Seat 53 is engaged by an annular truncated-cone end portion 54 on segment 38, the said portion 54 being connected flexibly to body 47 and ring 51 by means of two truncated-cone elastomer rings, 55 and 56, inserted and vulcanized between portion 54 and body 47, on one side, and between portion 54 and ring 51 on the other, so as to form joint 40.

As shown in FIG. 2, flanges 42 and 43 present mating outer edges 57 and 58, roughly sinusoidal in shape and defined by respective numbers of lobes 59 and 60, the latter being evenly and identically spaced around the axis of segment 39 and arranged in such a manner that each lobe 59 contacts a respective lobe 60. This arrangement is achieved by offsetting mating outer edges 57 and 58 by half a space.

Each pair of lobes 59 and 60 is fitted with a respective bolt 45 which engages coaxial holes 61 and 62 in lobes 59 and 60 respectively.

By unscrewing bolts 37 and 45 and screws 31, tubular member 33 may be released and its length shortened by turning segments 38 and 39 by the said half space in relation to each other, so as to cause the two mating edges 57 and 58 to coincide with each other. With edges 57 and 58 positioned in this way, flange 42 may be passed through flange 43 and member 33 shortened so as to afford access to bolts 24 and 25.

Once bolts 24 and 25 have been removed, segment 7 may be slid axially in relation to shaft 5 so as to enable axial release of segment 8 which may thus be removed together with the whole of member 33. Ring nut 29 and segment 9 may then be removed easily from the outside, such removal enabling casing 26 and the whole of unit 3 to be removed without affecting engine 2 whatsoever.

Member 33 may, of course, differ from the design described herein and comprise more than two connected segments and more than one segment consisting of disconnectable, telescopically-sliding portions such as portions 41 and 44. Flanges 42 and 43 may also differ from those described herein, providing they consist, generally speaking, of a series of gaps and solids designed in such a manner that, for at least one mutual angular position of the said two flanges, the gaps on one may be engaged axially by the solids on the other, and that, for at least one further angular position, the solids on one coincide with the solids on the other, so as to enable the assembly of bolts or other similar connecting means.

We claim:

1. Helicopter engine-drive assembly comprising an engine, a drive unit, a propeller shaft extending between the output on the said engine and the input on the said drive unit, and an articulated tubular member connected in removable manner, at one end, to the casing on the said engine and, at the other end, to the casing on the said drive unit, the said propeller shaft extending inside the said articulated tubular body, and the latter comprising at least two segments connected together by means of a universal joint, at least one of said two segments being reducible in length and comprising at least two coaxial portions adapted to engage each other telescopically; removable fastening means aligned axially with the two segments and provided for locking the said two portions in a fully extended end-to-end axial position.

2. Assembly according to claim 1, wherein said axial fastening means (45, 42, 43) comprise an external flange (42) and an internal flange (43) arranged facing each other; the said flanges (42, 43) extending respectively from the facing ends of the said two portions (42, 44), being connected to each other in said fully extended end-to-end position by means of removable connecting means (45), and having offset mating edges.

3. Assembly according to claim 2, characterised by the fact that the said two edges are roughly sinusoidal in shape; the said flanges (42, 43) comprising respective numbers of lobes (59, 60) evenly and identically spaced for both flanges (42, 43) around the axis of the said at least one segment (39); the lobes of one said number of lobes being offset by half a space in relation to those of the other said number of lobes, in such a manner that each lobe is arranging facing a corresponding lobe in the said other number; the said removable connecting means connecting each pair of matching lobes.

* * * * *